United States Patent
Low et al.

(10) Patent No.: US 9,506,803 B2
(45) Date of Patent: Nov. 29, 2016

(54) VEHICLE OPTICAL SENSOR SYSTEM

(71) Applicant: DELPHI TECHNOLOGIES, INC., Troy, MI (US)

(72) Inventors: Yew Kwang Low, Singapore (SG); Kok Wee Yeo, Singapore (SG); Thomas A. Degenkolb, Noblesville, IN (US); Ronald M. Taylor, Greentown, IN (US); Ward K. Everly, Kokomo, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 272 days.

(21) Appl. No.: 14/488,741

(22) Filed: Sep. 17, 2014

(65) Prior Publication Data

US 2016/0076934 A1 Mar. 17, 2016

(51) Int. Cl.
*G01J 1/42* (2006.01)
*G01J 1/04* (2006.01)
*G06K 9/00* (2006.01)
*H04N 5/225* (2006.01)

(52) U.S. Cl.
CPC ............ *G01J 1/4228* (2013.01); *G01J 1/0407* (2013.01); *G01J 1/4204* (2013.01); *G06K 9/00791* (2013.01); *H04N 5/2254* (2013.01); *H04N 5/2258* (2013.01); *B60R 2300/108* (2013.01)

(58) Field of Classification Search
CPC ..... G01J 1/4228; G01J 1/4204; G01J 1/0407
USPC ...................................................... 250/208.1
See application file for complete search history.

(56) References Cited

U.S. PATENT DOCUMENTS

| 7,230,260 | B1* | 6/2007 | Tarui | G01N 21/274 250/227.25 |
|---|---|---|---|---|
| 7,902,988 | B2* | 3/2011 | Goto | B60S 1/0837 340/332 |
| 2008/0283782 | A1 | 11/2008 | Blaesing et al. | |
| 2012/0314069 | A1 | 12/2012 | Taylor | |
| 2013/0201285 | A1* | 8/2013 | Mao | G02B 27/0093 348/46 |
| 2014/0097327 | A1* | 4/2014 | Hung | G06F 3/0425 250/206.1 |
| 2014/0226012 | A1 | 8/2014 | Achenbach | |
| 2015/0070499 | A1 | 3/2015 | Roelke et al. | |

FOREIGN PATENT DOCUMENTS

| DE | 10 2011 055928 A1 | 6/2013 |
|---|---|---|
| DE | 10 2012 200200 A1 | 7/2013 |
| EP | 1 580 092 A2 | 9/2005 |
| EP | 1 764 835 A1 | 3/2007 |

\* cited by examiner

*Primary Examiner* — Seung C Sohn
(74) *Attorney, Agent, or Firm* — Lawrence D. Hazelton

(57) ABSTRACT

An optical sensor system adapted to operate through a window of a vehicle includes a lens, a plurality of optoelectronic devices, and an optical device. The lens is configured to direct light from a field-of-view toward a focal plane. The plurality of optoelectronic devices are arranged proximate to the focal plane. The plurality of optoelectronic devices includes a first optoelectronic device operable to detect an image from a first portion of the field-of-view, and a second optoelectronic device operable to detect light from a second portion of the field-of-view distinct from the first portion. The optical device is configured to direct light from outside the field-of-view toward the second portion.

7 Claims, 3 Drawing Sheets

VEHICLE OPTICAL SENSOR SYSTEM

TECHNICAL FIELD OF INVENTION

This disclosure generally relates to a vehicle optical sensor system, and more particularly relates to an optical sensor system with multiple optoelectronic devices receiving images through a shared lens, and an optical device that expands the effective field-of-view of the lens.

BACKGROUND OF INVENTION

Optical sensor systems are frequently used in automobiles and other vehicles to provide images of areas around the vehicle. In some instances, these images are used by various vehicle warning and control systems. In the example of forward looking optical sensor systems, the images provided by the sensor may be used as inputs for collision avoidance, lane departure detection, forward collision warning, side warning, adaptive cruise control, night vision, headlight control, rain sensing systems and others. Typically, a forward looking optical sensor system is located behind the windshield near the rear view mirror to obtain a view of the road ahead which is similar to the driver's view. Optical sensor systems may also be used to view the area behind a vehicle for backing up, trailer towing, rearward collision warning, and rear blind zone warning systems. Additionally, optical sensor systems may be used to determine occupant position for restraint systems, rear seat occupant monitoring, or security and intrusion detection systems. Other examples of optical sensor systems include a rain sensor that optically detects the presence of moisture (e.g. rain drops or condensation) on the windshield, and an ambient light sensor that determines ambient lighting conditions outside the vehicle so, for example, the brightness of a display inside the vehicle can be varied to be readily viewable during various ambient lighting conditions.

The cost of individual sensor systems for each of these vehicle warning or control systems, plus the challenges of efficiently packaging multiple optical sensor systems in a vehicle make it desirable to use a single sensor system to provide images or signals for multiple vehicle warning and control systems. Unfortunately, performance tradeoffs exist when using a single optical sensor system due to light sensitivity, spectrum sensitivity, and field-of-view requirements specific to each vehicle warning and control system. These performance tradeoffs have previously precluded optimum performance for every vehicle warning and control system.

For example, a night vision system may require an optical sensor system with high light sensitivity because of the need to sense contrast of objects at long ranges with very little active illumination. In contrast, a lane departure system may accommodate an optical sensor system with lower light sensitivity because daylight or headlights (at closer ranges) provide sufficient lighting.

Light sensitivity is primarily determined by the pixel size of the optoelectronic device used in the optical sensor system to convert light to an electrical signal; a larger pixel has more area available for photons to strike the pixel and be absorbed. As used herein, an optoelectronic device is a component of an optical sensor system that may be operable to generate a video signal. However, a larger pixel size requires a larger optoelectronic device for equivalent pixel resolution. Light sensitivity for a given pixel size may be improved by increasing the exposure time. However, longer exposure time will decrease the frame rate of the images. Additionally, light sensitivity can be increased by using a larger aperture lens to allow more light to fall on the pixels of the sensor. However, a larger aperture usually requires a larger lens, which increases the packaging size of the optical sensor system.

Different vehicle warning and control systems may also require an optical sensor system with different spectrum sensitivity. For example a tail light detection system may require sensitivity to red light, a lane departure detection system may require sensitivity to yellow light, and a night vision system may require sensitivity to infrared light. There are performance tradeoffs that may be required if a single optical sensor system is used with all three of these vehicle warning and control systems.

Different vehicle warning and control systems may also require an optical sensor system with a different field-of-view. For example, a rain detection system may need a wide field-of-view while an adaptive cruise control system may need a narrower field-of-view. Again, using a single optical sensor system may require performance tradeoffs.

SUMMARY OF THE INVENTION

In accordance with one embodiment, an optical sensor system adapted to operate through a window of a vehicle is provided. The system includes a lens, a plurality of optoelectronic devices, and an optical device. The lens is configured to direct light from a field-of-view toward a focal plane. The plurality of optoelectronic devices are arranged proximate to the focal plane. The plurality of optoelectronic devices includes a first optoelectronic device operable to detect an image from a first portion of the field-of-view, and a second optoelectronic device operable to detect light from a second portion of the field-of-view distinct from the first portion. The optical device is configured to direct light from outside the field-of-view toward the second portion.

In one embodiment, the second optoelectronic device and the optical device cooperate to form a rain sensor for detecting moisture on the window.

In another embodiment, the second optoelectronic device and the optical device cooperate to form an ambient light sensor for controlling illuminated devices on the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
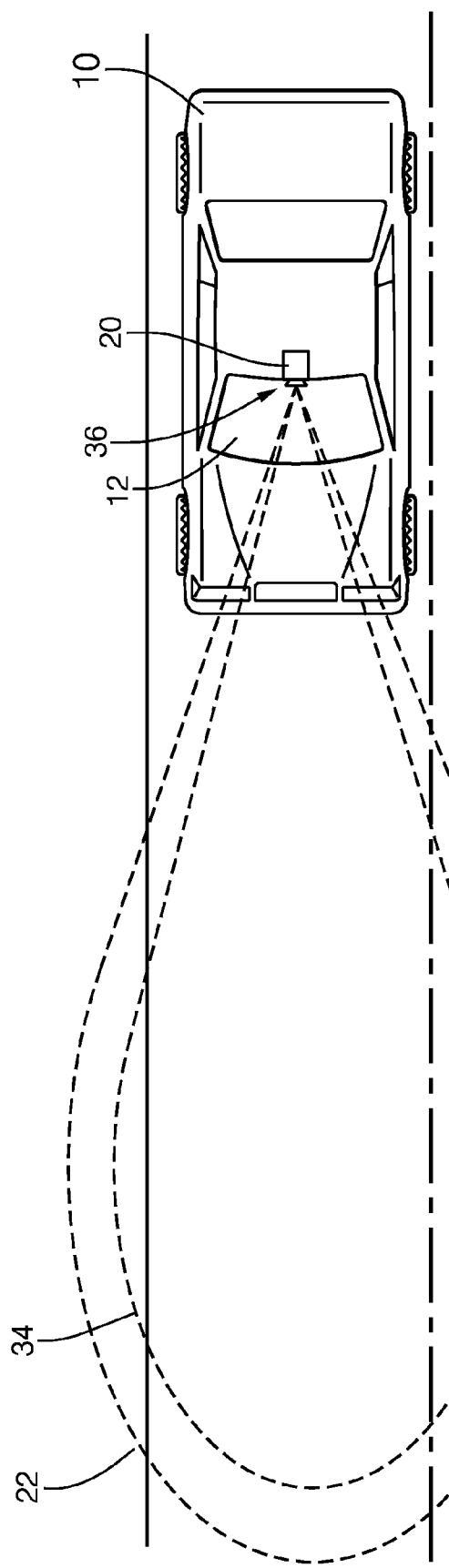
FIG. 1 is an illustration of a field-of-view about a vehicle of an optical sensor system in accordance with one embodiment.

FIG. 1 illustrates a non-limiting example of a vehicle 10 equipped with an optical sensor system, hereafter referred to as the system 20, that provides information based on images and lighting about the vehicle 10. The system 20 is adapted to operate (i.e. look) through a window 12 of the vehicle. The system 20 is generally positioned on the vehicle 10 to observe a field-of-view 22 about the vehicle 10. The field-of-view 22 is illustrated as being forward of the vehicle 10 for detecting objects in or near the travel path of the vehicle 10, but may also be directed toward an area beside the vehicle 10 to detect objects such as other vehicles in adjacent lanes. Alternatively, the field-of-view 22 may be behind the vehicle 10 to detect, for example, objects behind the vehicle 10 while backing up or monitoring a trailer while towing. The field-of-view 22 may also include an area of the interior of the vehicle 10, for example to detect whether occupants are in a proper position to active a supplemental restraint system, such as an air bag, or to monitor passengers in the rear seats.

Figure 2:
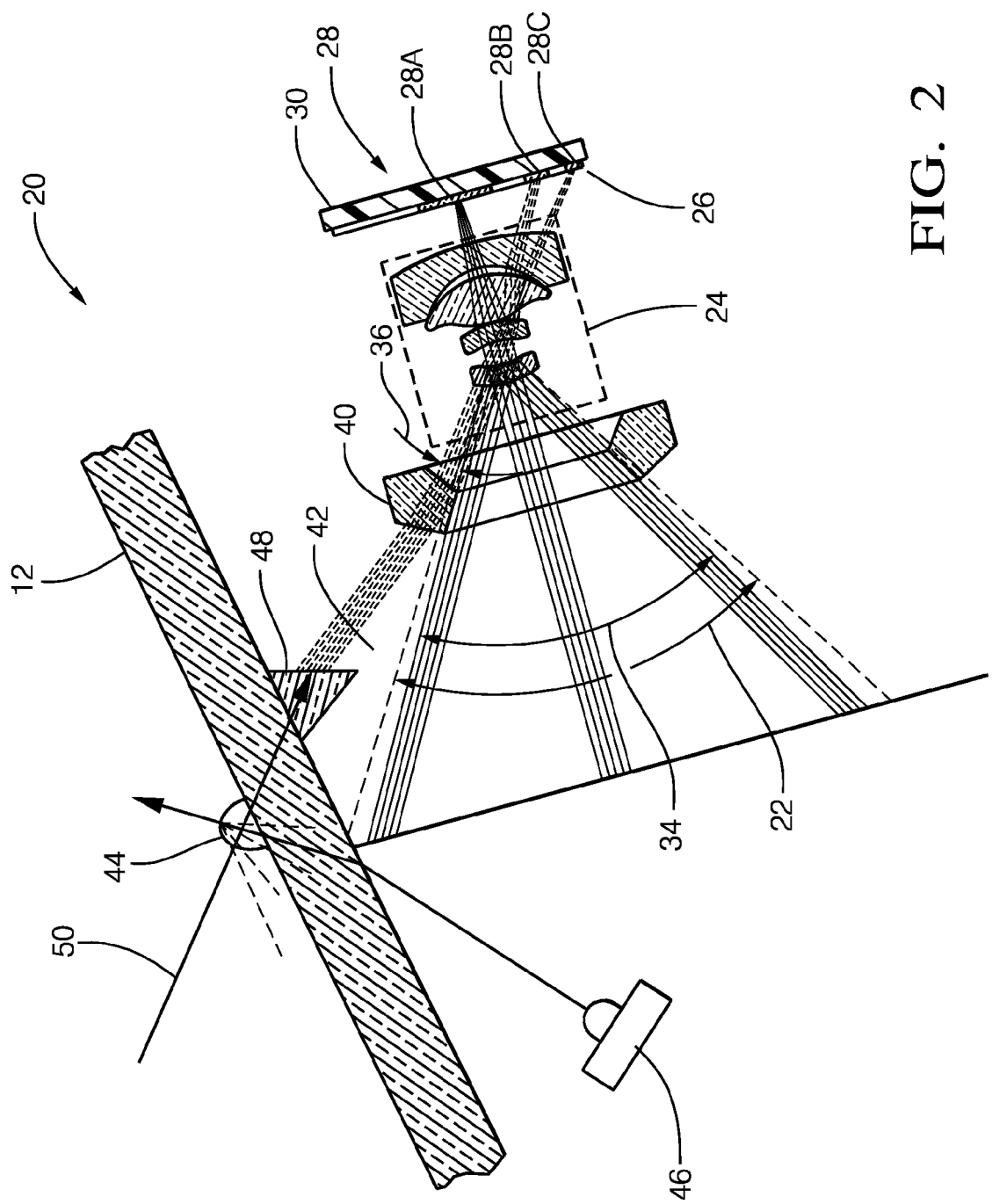
FIG. 2 is a side-view illustration of part of the optical sensor system of FIG. 1 in accordance with one embodiment.
Figure 3:
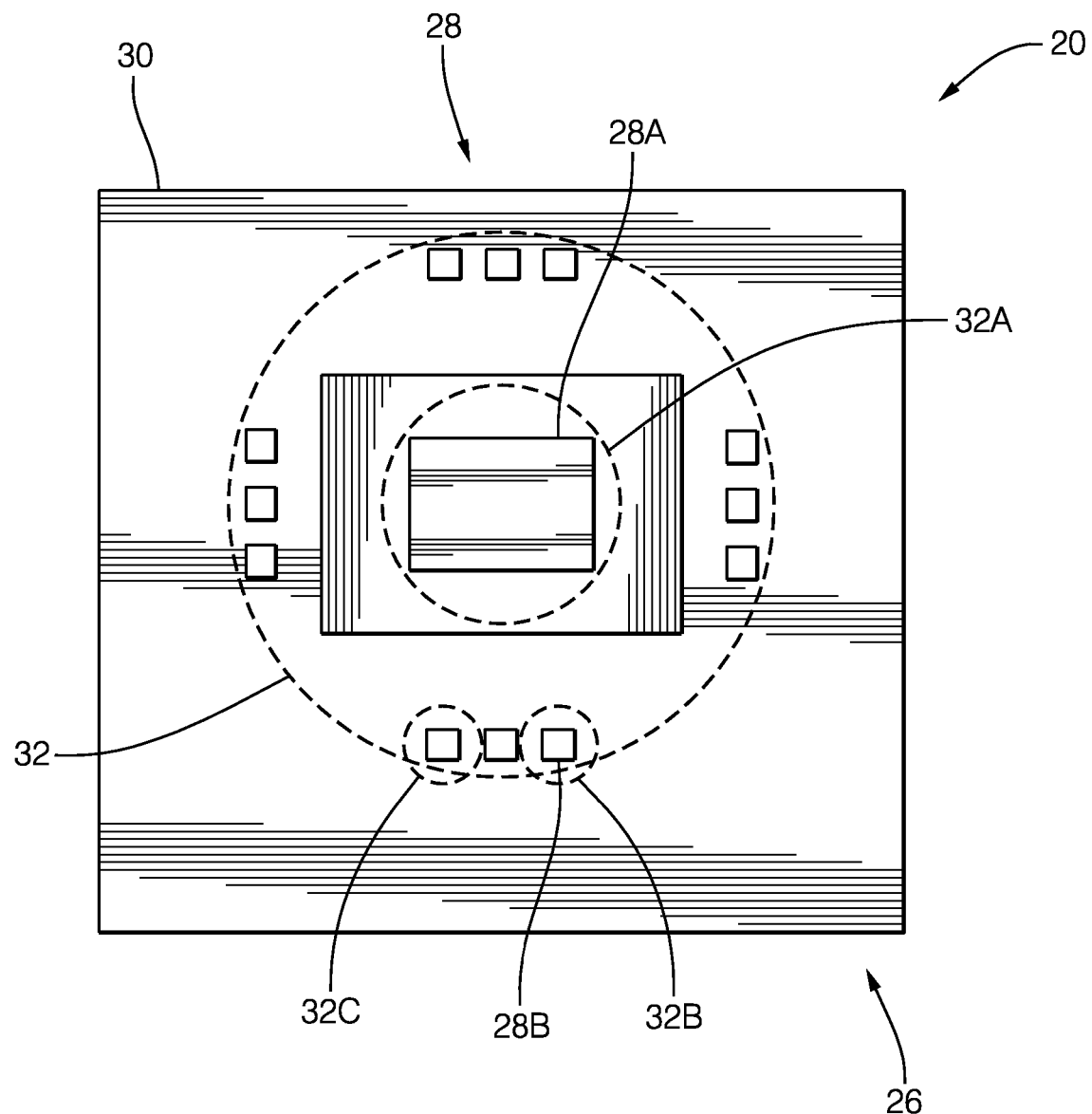
FIG. 3 is a front view illustration of part of the optical sensor system of FIG. 1 in accordance with one embodiment.

FIGS. 2 and 3 illustrate non-limiting details of the system 20. The system 20 includes a lens 24 configured to direct light from a field-of-view 22 toward a focal plane 26 of the lens. The field-of-view 22 is typically cone shaped and defined by a viewing angle of the lens 24. By way of example and not limitation, the lens 24 in this example has four aspherical glass elements configured to provide an effective focal length of 4.8 mm and a maximum field of view (i.e. the viewing angle of the field-of-view 22) of 64 degrees.

The system 20 also includes a plurality of optoelectronic devices 28 arranged proximate to the focal plane 26. The plurality of optoelectronic devices 28 may be attached to a printed circuit board 30, as will be recognized by those in the art. A key cost saving aspect of the system 20 described herein is that all of the plurality of optoelectronic devices 28 receive light through the lens 24. That is, the lens 24 is shared by all of the plurality of optoelectronic devices 28 which are located within a projection area 32 of the lens 24, and on or near to the focal plane 26. The projection area 32 is also known as the "image circle" by those in the art. However, as each of the plurality of optoelectronic devices 28 occupies a different region of the projection area 32 on the focal plane 26, it will be recognized that each of the plurality of optoelectronic devices 28 will receive light from a different portion of the field-of-view 22.

By way of example and not limitation, the plurality of optoelectronic devices 28 may include a first optoelectronic device 28A operable to detect an image from a first portion 34 of the field-of-view 22 which is directed onto a first region 32A of the projection area 32 where the first optoelectronic device 28A resides. Imaging devices capable of creating video signals based on an image present on the imaging device are well known and commercially available. In this non-limiting example, the first optoelectronic device 28A is a model OV10626 imager from OmniVision Inc. with offices in Santa Clara, Calif., USA.

The system 20 also includes a second optoelectronic device 28B operable to detect light from a second portion 36 of the field-of-view 22 that is distinct from the first portion 34 and is directed into a second region 32B of the projection area 32 where the second optoelectronic device 28B resides. The second optoelectronic device 28B is typically characterized as more of a light sensor than an imaging device. That is, the second optoelectronic device 28B does not generate a signal indicative of an image in the traditional sense, but rather provides an indication of the intensity and/or spectral composition of the light detected by the second optoelectronic device 28B. Specific examples of to second optoelectronic device 28B that provide particular functions to the system 20 are provided below.

The system 20 advantageously includes an optical device 40 configured to direct light from outside the field-of-view 22 toward the second portion 36. In this example the optical device 40 is in the form of an annular ring configured to cooperate with the perimeter of the lens 24 to capture light from outside of the field-of-view 22. In other words, if the annular ring (the optical device 40) was removed, the lens 24 would only receive light from the area bounded by the viewing angle of the lens 24 by itself, i.e. the natural or unassisted field-of-view (the field-of-view 22) of the lens 24. As such, the first portion 34 of the field-of-view 22 is smaller than the field-of-view 22. However, with the addition of an inexpensive optical device such as an annular ring, the effective field-of-view of the system can be expanded, the advantages of which will become apparent in the description below.

A suitable example of the optical device 40 is an annular ring formed of N-BK7 optical glass material from Schott and is comparable to a diverging meniscus lens with an inner radius of 4.4 mm and an outer radius of 10.4 mm. The central portion or core is removed to create a ring to provide the lens 24 an unobstructed view of the first portion 34. While the cross-section profile of the annular ring (the optical device 40) is shown as being constant about the ring, this is not a requirement. That is, it is recognized that the cross-section profile could be varied about the optical device so that the direction and/or scope of light captured by the optical device 40 from outside the field-of-view 22 and directed into the second portion 36 varies about the optical device 40. Alternatively, the optical device could be a mirror, a prism, or a combination of mirrors and prisms arranged to direct light from outside the field-of-view 22 and into the second portion 36.

An effect of adding the optical device 40 is that a blind zone 42 may be created between the first portion 34 and the second portion 36. That is, the lens 24 and the optical device 40 cooperate to create the blind zone 42 between the first portion 34 and the second portion 36 such that light emanating from the blind zone 42 does not reach the lens 24 or the projection area 32, at least not directly. It is recognized that the complexity and cost of the lens 24 could be increased to increase viewing angle of the lens 24 that defines the field-of-view 22, which could avoid creating the blind zone 42. However, the total cost of the system 20 can be reduced by using a less expensive version of lens 24 in combination with the optical device 40 since, as will become apparent in the description below, the creation of the blind zone 42 does not inhibit the desired operation of the system 20 described herein.

In one embodiment, the second optoelectronic device 28B and the optical device 40 cooperate to form a rain sensor for detecting moisture 44 on the window 12. The moisture 44 is illustrated as a well-defined droplet only for the purpose of simplifying the explanation. It is recognized that optical rain sensors for windshields are commercially available and the principle of operation is known. For example, it is known that such optical rain sensors are capable of detecting mist or other fine condensation on a windshield of a vehicle. By way of example and not limitation, a suitable example of the second optoelectronic device 28B to form a rain sensor is part number TEMD7100X01 from Vishay with offices in Shelton, Conn., USA.

The system 20 may include a light source, such as a near-infrared (NIR) light source to illuminate the moisture 44 and thereby assist the system 20 to detect the moisture 44 on the window. That is, the system may include an infrared light source 46 configured emit light toward the window 12 where the rain sensor is detecting moisture on the window 12, where the detection is based on signals from the second optoelectronic device 28B. The infrared light source 46 is typically located within a housing (not shown) that encompasses the lens 24 and other related parts of the system 20, and positioned so that the incidence angle of light from the infrared light source 46 at the moisture 44 matches the incidence angle of light reflected by the window in the absence of the moisture 44.

If the preferred angle of incidence to the window 12 makes the preferred orientation for the second portion 36 of the field-of-view 22 inconvenient for packaging the system 20, or makes the preferred location or orientation of the optical device 40 inconvenient, the system 20 may include a prism 48 configured to direct (i.e. bend or refract) light that was emitted by the infrared light source 46 and reflected by the window 12 toward the optical device 40. Alternatively, or in addition, the system 20 may include one or more mirrors (not shown) that may be attached to the housing or elsewhere to assist with directing light from the infrared light source 46 toward the window 12, or light from outside the field-of-view 22 toward the plurality of optoelectronic devices 28.

In one embodiment of the system 20, the second optoelectronic device 28B and the optical device 40 cooperate to form an ambient light sensor for controlling illuminated devices (e.g. an illuminated instrument display) on the vehicle based on the intensity of ambient light 50 impinging on the window 12. By way of example and not limitation, a suitable example of the second optoelectronic device 28B to form an ambient light sensor is part number TEMD7000X01 from Vishay with offices in Shelton, Conn., USA.

In another embodiment, the system 20 may include a third optoelectronic device 28C operable to detect light via a third portion (not show but could be part of the second portion 36) of the field-of-view 22 which is directed onto a third region 32C of the projection area 32 distinct from the first region 32A and the second region 32B, and where the third optoelectronic device 28C resides. While not specifically illustrated, it is understood that the third portion may be distinct from the first portion 34 and the second portion 36. Accordingly, the optical device 40 may be further configured to direct light from outside the field-of-view 22 into the third portion. By way of example, the system 20 may then be equipped with both a rain sensor and an ambient light sensor. That is, the second optoelectronic device 28B and the optical device 40 cooperate to form a rain sensor for detecting moisture on the window 12, and the third optoelectronic device 28C and the optical device 40 cooperate to form an ambient light sensor for controlling illuminated devices on the vehicle 10.

Accordingly, an optical sensor system (the system 20) is provided. The system uses the excess of the field-of-view 22 of the lens 24 that is available within the projected area 32 but not needed by the vision sensor to detect an image from a first portion 34 to place a rain sensor and/or daylight/ambient light sensor and/or other sensors around first optoelectronic device 28A. The system may include a NIR LED source (the infrared light source 46) operated by a continuous, pulsed, sine wave, or other signal and used at either TIR (total internal reflection) angle or incident to the window 12 directed to the edge of the field. The second optoelectronic device 28B may also include a narrow band NIR filter (not shown) to diminish noise from sun light and other ambient lightings on the road. In this way, the economic efficiency of the system 20 is improved as the image, rain and daylight sensors share the lens 24. That is, the rain sensor and daylight sensors are located on a shared circuit board and receive light thru same optical system within the same light shield enclosure. This allows for flexibility in design for various applications when compared to traditional or wafer level camera assemblies. This avoids the additional footprint on windscreen arising from separate sensors for rain and light sensing.

While this invention has been described in terms of the preferred embodiments thereof, it is not intended to be so limited, but rather only to the extent set forth in the claims that follow.

We claim:

1. An optical sensor system adapted to operate through a window of a vehicle, said optical sensor system comprising:
   a lens configured to direct light from a field-of-view toward a focal plane;
   a plurality of optoelectronic devices arranged proximate to the focal plane, wherein said plurality of optoelectronic devices includes a first optoelectronic device operable to detect an image from a first portion of the field-of-view, and a second optoelectronic device operable to detect light from a second portion of the field-of-view distinct from the first portion; and
   an optical device configured to direct light from outside the field-of-view toward the second portion.

2. The system in accordance with claim 1, wherein the lens and the optical device cooperate to create a blind zone between the first portion and the second portion.

3. The system in accordance with claim 1, wherein the second optoelectronic device and the optical device cooperate to form a rain sensor for detecting moisture on the window.

4. The system in accordance with claim 3, wherein the system includes an infrared light source configured emit light toward the window where the rain sensor is detecting moisture on the window.

5. The system in accordance with claim 4, wherein the system includes a prism configured to direct light that was emitted by the infrared light source and reflected by the window toward the optical device.

6. The system in accordance with claim 1, wherein the second optoelectronic device and the optical device cooperate to form an ambient light sensor for controlling illuminated devices on the vehicle.

7. The system in accordance with claim 1, wherein the system includes a third optoelectronic device operable to detect light via a third portion of the field-of-view distinct from the first portion and the second portion, the optical device is further configured to direct light from outside the field-of-view into the third portion, the second optoelectronic device and the optical device cooperate to form a rain sensor for detecting moisture on the window, and the third optoelectronic device and the optical device cooperate to form an ambient light sensor for controlling illuminated devices on the vehicle.

* * * * *